United States Patent [19]
Ekman et al.

[11] Patent Number: 5,927,817
[45] Date of Patent: Jul. 27, 1999

[54] VENTILATED VEHICLE SEAT ASSEMBLY

[75] Inventors: Anders Ekman, Trollhätten; Jack Kagerin, Vänersborg; Kent Thuresson, Trollhätten, all of Sweden

[73] Assignee: Lear Corporation, Southfield, Mich.

[21] Appl. No.: 08/919,077

[22] Filed: Aug. 27, 1997

[51] Int. Cl.$^6$ .................................................. A47C 7/02
[52] U.S. Cl. ................ 297/452.47; 297/180.14
[58] Field of Search ................ 297/180.1, 180.13, 297/180.14, 452.42, 452.46, 452.47, 452.55, 452.58, 452.43

[56] References Cited

U.S. PATENT DOCUMENTS

| | | |
|---|---|---|
| 3,137,523 | 6/1964 | Karner . |
| 3,895,841 | 7/1975 | Lebert .............................. 297/452.47 X |
| 4,685,727 | 8/1987 | Cremer et al. . |
| 4,793,574 | 12/1988 | Fenske et al. ................ 2597/452.47 X |
| 5,102,189 | 4/1992 | Saito et al. . |
| 5,356,205 | 10/1994 | Calvert et al. .................. 297/180.14 X |
| 5,403,065 | 4/1995 | Callerio . |
| 5,597,200 | 1/1997 | Gregory et al. ..................... 297/180.13 |
| 5,613,729 | 3/1997 | Summer, Jr. . |
| 5,626,386 | 5/1997 | Lush .................................... 297/180.13 |
| 5,626,387 | 5/1997 | Yeh ..................................... 297/180.14 |

FOREIGN PATENT DOCUMENTS

| | | |
|---|---|---|
| 0 206 152 | 12/1986 | European Pat. Off. . |
| 94.417 | of 1969 | France . |
| 2 686 299 | 7/1993 | France . |
| 2 744 896 | 8/1997 | France . |
| 37 25 146 A1 | 2/1989 | Germany . |
| 43 08 119 | 7/1996 | Germany . |
| 5-23235 | 2/1993 | Japan ................................. 297/180.13 |
| 7209741-3 | 7/1976 | Sweden . |
| 8703176-1 | 7/1989 | Sweden . |
| 957135 | 5/1964 | United Kingdom . |
| 8901306 | 2/1989 | WIPO ............................... 297/180.14 |
| WO 96 05475 | 2/1996 | WIPO . |
| WO 97/09908 | 3/1997 | WIPO . |
| WO 97 09909 | 3/1997 | WIPO . |

OTHER PUBLICATIONS

International Search Report, Oct. 29, 1998.

*Primary Examiner*—Milton Nelson, Jr.
*Attorney, Agent, or Firm*—Brooks & Kushman P.C.

[57] ABSTRACT

A vehicle seat assembly includes a seat back with a seat back foam cushion therein having front and rear surfaces. The seat back foam cushion includes a plurality of air channels formed therethrough from the front to rear surface. A lower seat includes a lower foam cushion therein having top and bottom surfaces. The lower foam cushion includes a plurality of air holes formed therethrough from the top to the bottom surface. A porous trim cover is positioned over the seat back foam cushion and lower foam cushion. A first impeller is positioned in fluid communication with the plurality of air channels for creating a vacuum for drawing heat and moisture away from the trim cover material. Similarly, a second impeller is positioned in fluid communication with the plurality of air holes in the lower foam cushion for creating a vacuum for drawing heat and moisture away from the trim cover material. A porous cushion member is provided within the seat back foam cushion and lower foam cushion for allowing air to flow therethrough while providing cushioning support for the vehicle occupant.

12 Claims, 5 Drawing Sheets

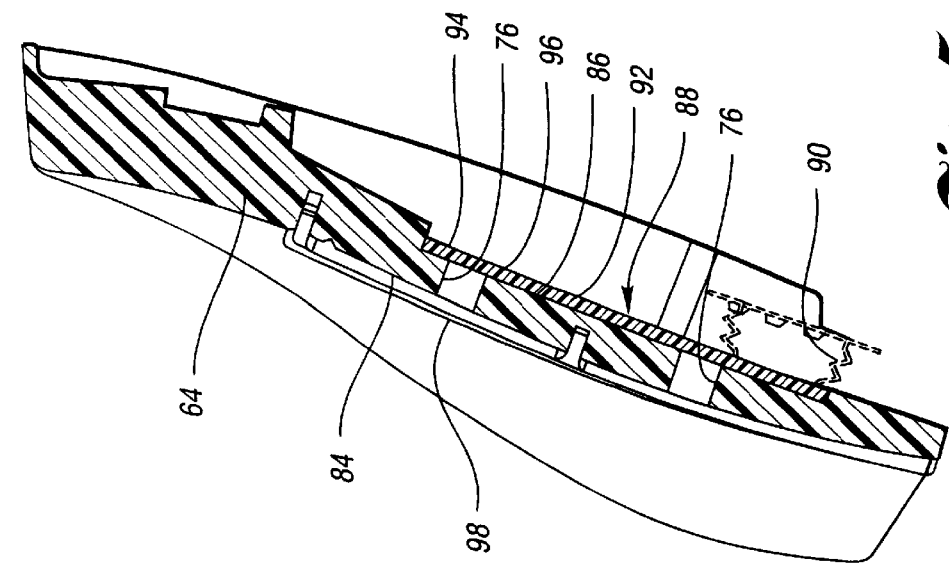
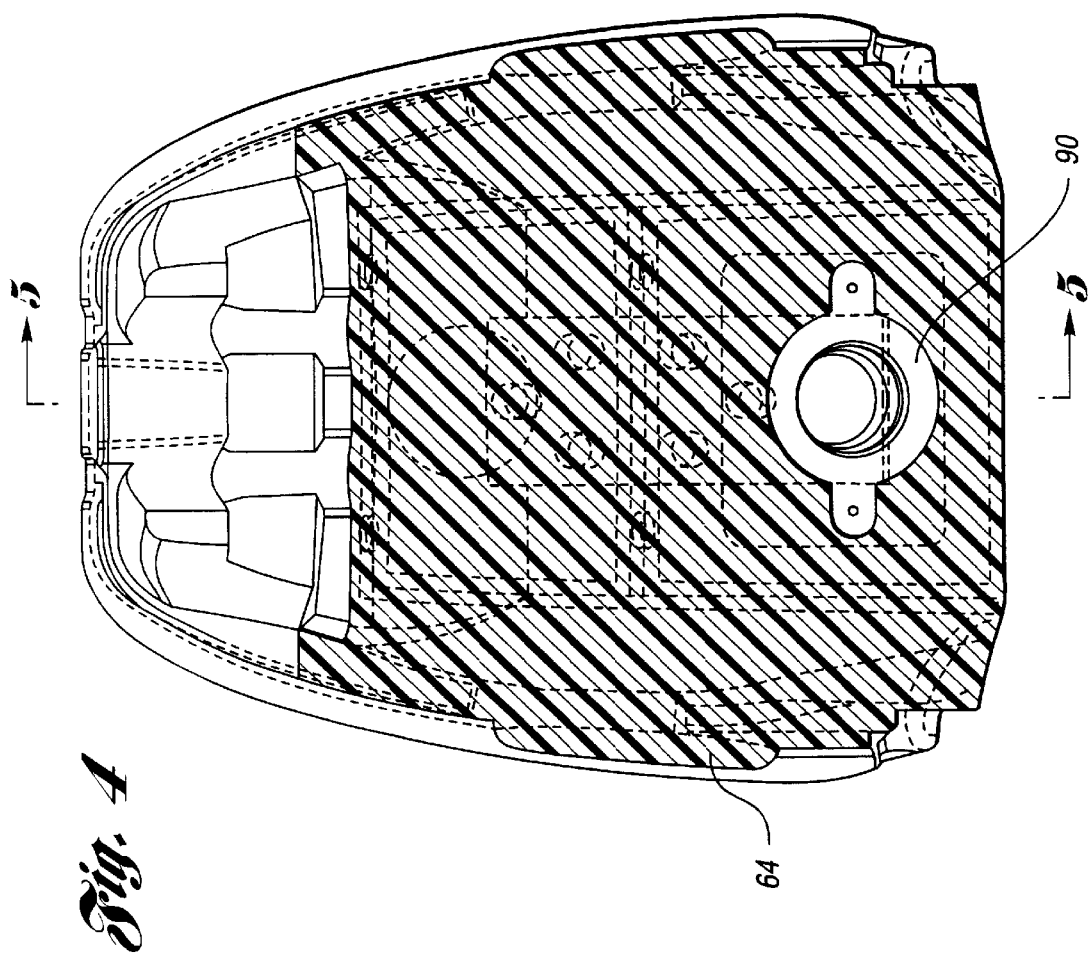

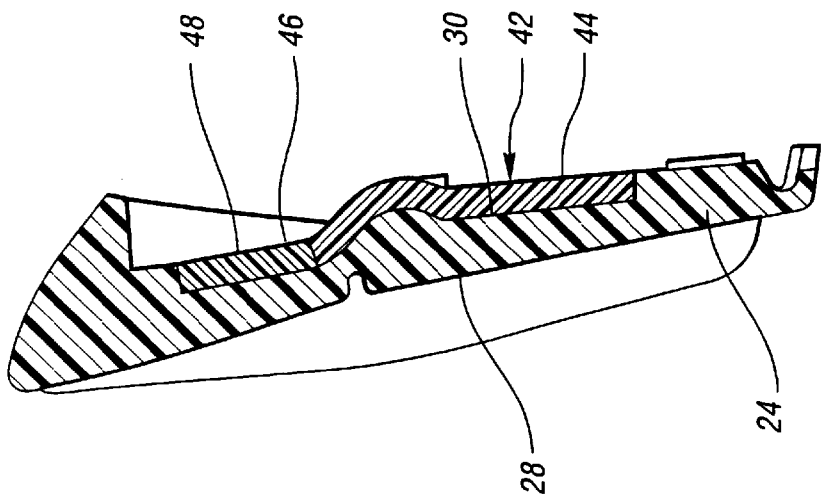
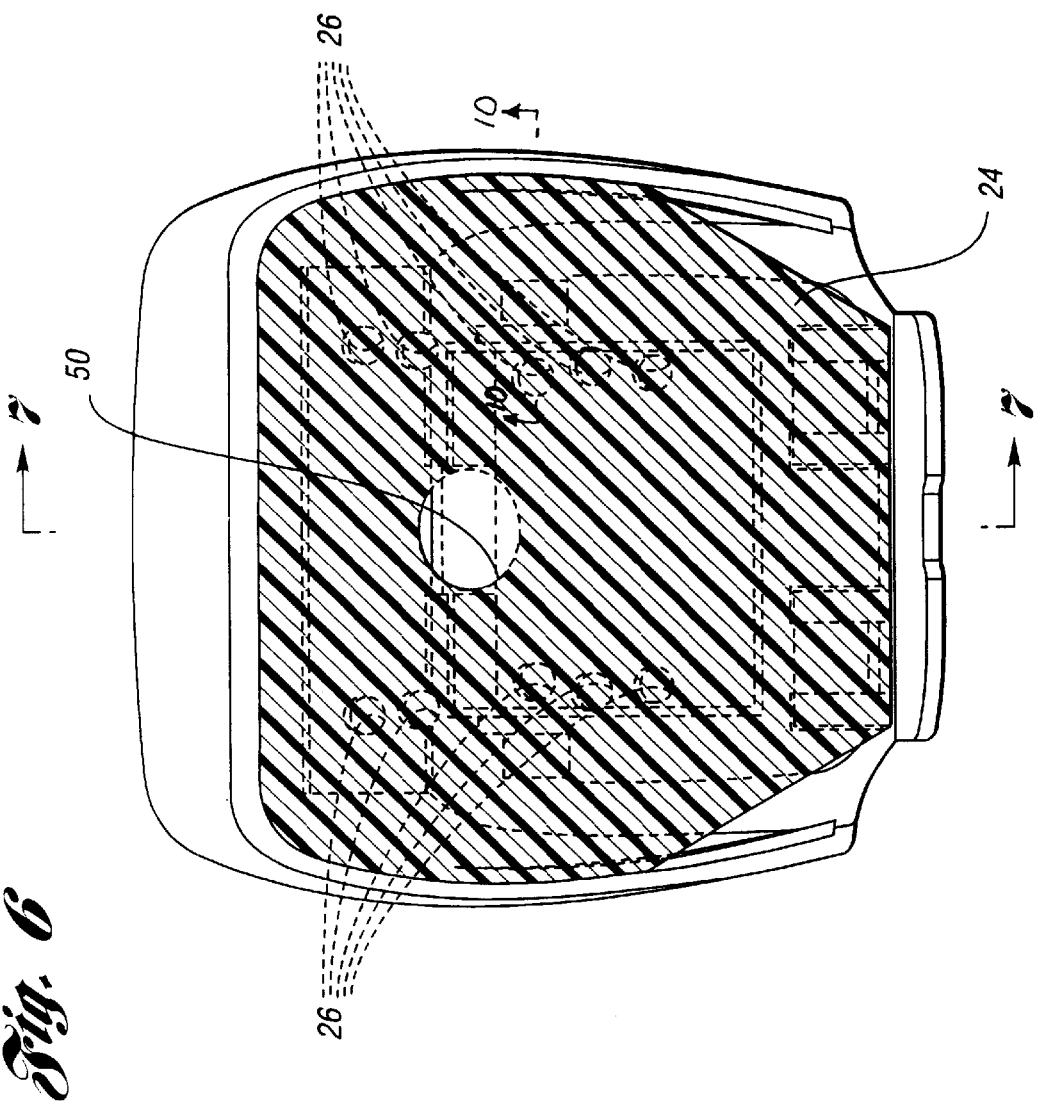

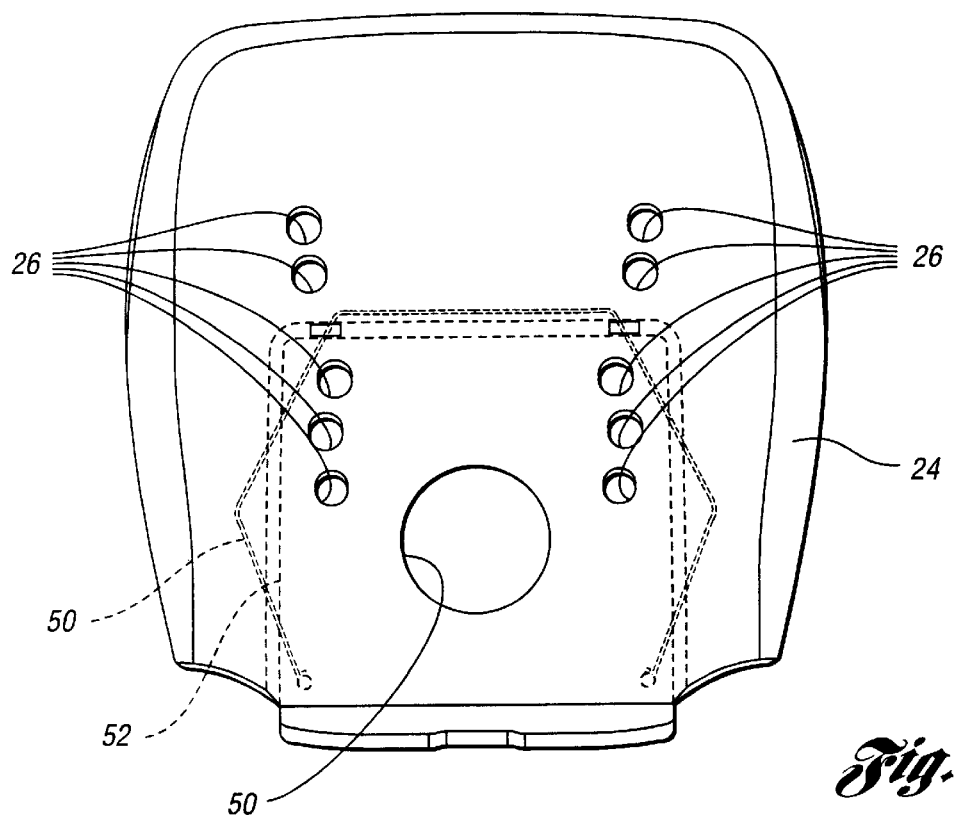
_Fig. 8_
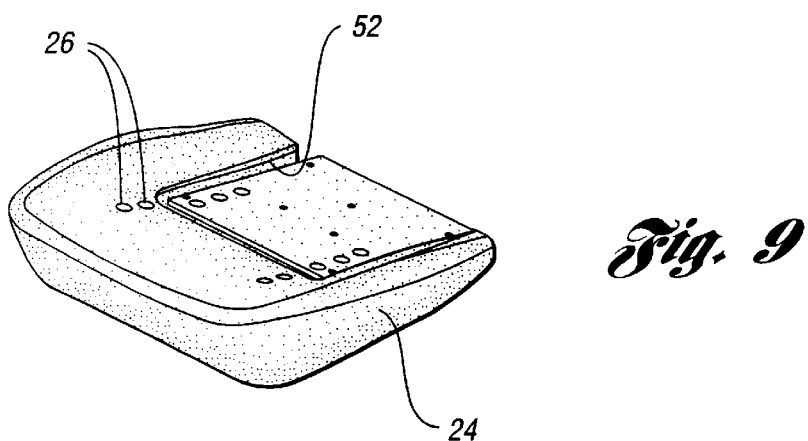
_Fig. 9_
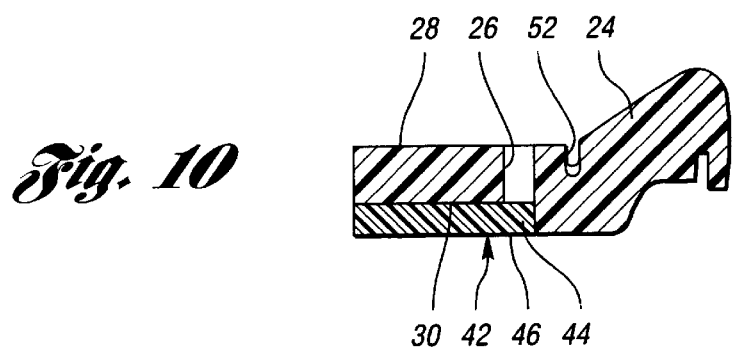
_Fig. 10_

VENTILATED VEHICLE SEAT ASSEMBLY

TECHNICAL FIELD

The present invention relates to a vented vehicle seat assembly, and more particularly to a vehicle seat assembly with air channels formed within the seat cushions for passing air therethrough, wherein elongated channels are filled with a porous cushion material for cushioning the vehicle occupant.

BACKGROUND OF THE INVENTION

Over the past several years, vehicle seat heating has become increasingly popular in improving the comfort of vehicle seats. Typically, seat heating is provided by one or more heating mats positioned within the seat. Some designers have suggested the use of channels within the seat through which heated air passes for heating the surface of the seat. Additionally, it is known to introduce air into the seat and to permit the air to exit out of the seat against the support surface in order to achieve a cooling effect. However, the draft produced in this manner may be considered uncomfortable and undesirable for the occupant. Also, if the air is discharged directly toward the user, the user will generally block any air holes, which prevents cooling and can lead to user perspiration and dampening of clothes.

U.S. Pat. No. 4,685,727 suggests a configuration in which a large air channel is formed directly behind the vehicle seat trim cover, and air is flown through the channel for drawing moisture away from the trim cover surface for improving occupant comfort. However, only limited transfer of heat and moisture through the trim cover is possible with such a configuration because the air flow is adjacent to the rear surface and no significant pressure differential is created between the channel and the trim cover surface. Furthermore, positioning the channel directly behind the trim cover affects occupant comfort, and therefore must be compensated by appropriate support structure vertically and laterally along the seat, as described in the '727 patent.

Accordingly, it is desirable to provide a seat ventilation system for drawing heat and moisture away from the surface of the seat in a manner in which an increased amount of heat and moisture can be drawn from such surface, and large, uncushioned channels are not required within the seat which adversely affect the support structure of the seat, thus requiring additional support structure, which adds cost to the seat.

DISCLOSURE OF THE INVENTION

The present invention overcomes the above-referenced short-comings of prior art vehicle seat ventilation assemblies by providing a ventilation assembly in which a vacuum is created behind the trim cover for creating a large pressure differential for drawing heat and moisture directly through the trim cover, and elongated air flow channels include porous cushions therein for enhancing cushioning of the vehicle occupant.

More specifically, the present invention provides a vehicle seat assembly including a seat back with a seat back foam cushion therein having front and rear surfaces. The seat back foam cushion includes a plurality of air channels formed therethrough from the front to rear surface. A porous trim cover material is positioned adjacent the front surface of the seat back foam cushion. A first impeller is positioned in fluid communication with the plurality of air channels for creating a vacuum for drawing heat and moisture away from the trim cover material through the air channels.

In a preferred embodiment, a rear flow channel is formed along the rear surface of the seat back foam cushion in fluid communication with the plurality of air channels for directing air flow toward the first impeller. The rear flow channel is filled with a porous cushion member through which air flows. The porous cushion member also provides cushioning support for the vehicle occupant. The porous cushion member is preferably a rubber hair material, or other such material with open cells for allowing air to pass therethrough.

The preferred embodiment further includes a lower seat including a lower foam cushion therein having top and bottom surfaces. The lower foam cushion includes a plurality of air holes formed therethrough from the top to the bottom surface. The porous trim cover extends from the seat back foam cushion across the top surface. A second impeller is positioned in fluid communication with the plurality of air holes for creating a vacuum for drawing heat and moisture away from the trim cover material. A bottom flow channel is formed along the bottom surface in fluid communication with the plurality of air holes for directing air flow toward the second impeller. The bottom flow channel is filled with a porous cushion member through which air flows. The porous cushion member also provides cushioning support for the vehicle occupant.

Accordingly, an object of the present invention is to provide a vehicle seat ventilation system in which an increased pressure differential is generated across the trim cover for increasing the amount of heat and moisture drawn away by the ventilation system.

Another object of the present invention is to provide a vehicle seat ventilation assembly which includes a porous cushion member within an elongated air flow channel for enhancing cushioning of the vehicle occupant while allowing air flow to pass therethrough.

Another object of the present invention is to provide a vehicle seat ventilation assembly with a pair of impellers positioned for creating a vacuum within the seat for drawing heat and moisture away from the seat trim cover material.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 3 shows an exploded perspective view of a lower seat assembly in accordance with the present invention;

FIG. 4 shows a top plan view of a seat back foam assembly in accordance with the present invention;

FIG. 5 shows a sectional view taken at line 5—5 of FIG. 4;

FIG. 6 shows an underside plan view of a lower seat cushion foam assembly in accordance with the present invention;

FIG. 7 shows a sectional view taken at line 7—7 of FIG. 6;

FIG. 8 shows a top plan view of the lower seat cushion assembly of FIG. 6;

FIG. 9 shows a perspective view of a lower seat cushion assembly; and

FIG. 10 shows a sectional view taken at line 10—10 of FIG. 6.

DETAILED DESCRIPTION OF THE PREFERRED EMBODIMENT

Figure 1:
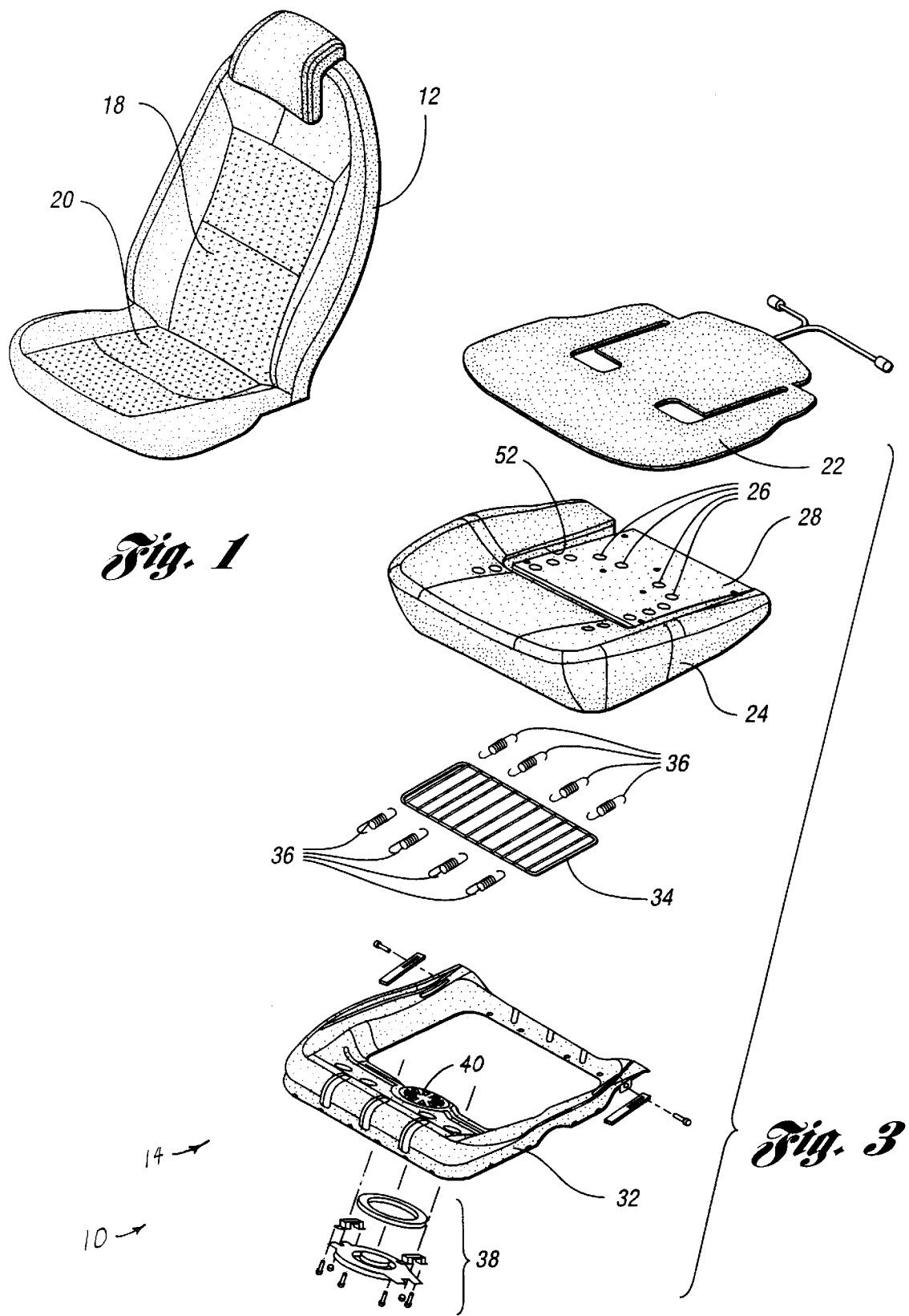
FIG. 1 shows a perspective view of a leather trim cover for use in the present invention.
Figure 2:
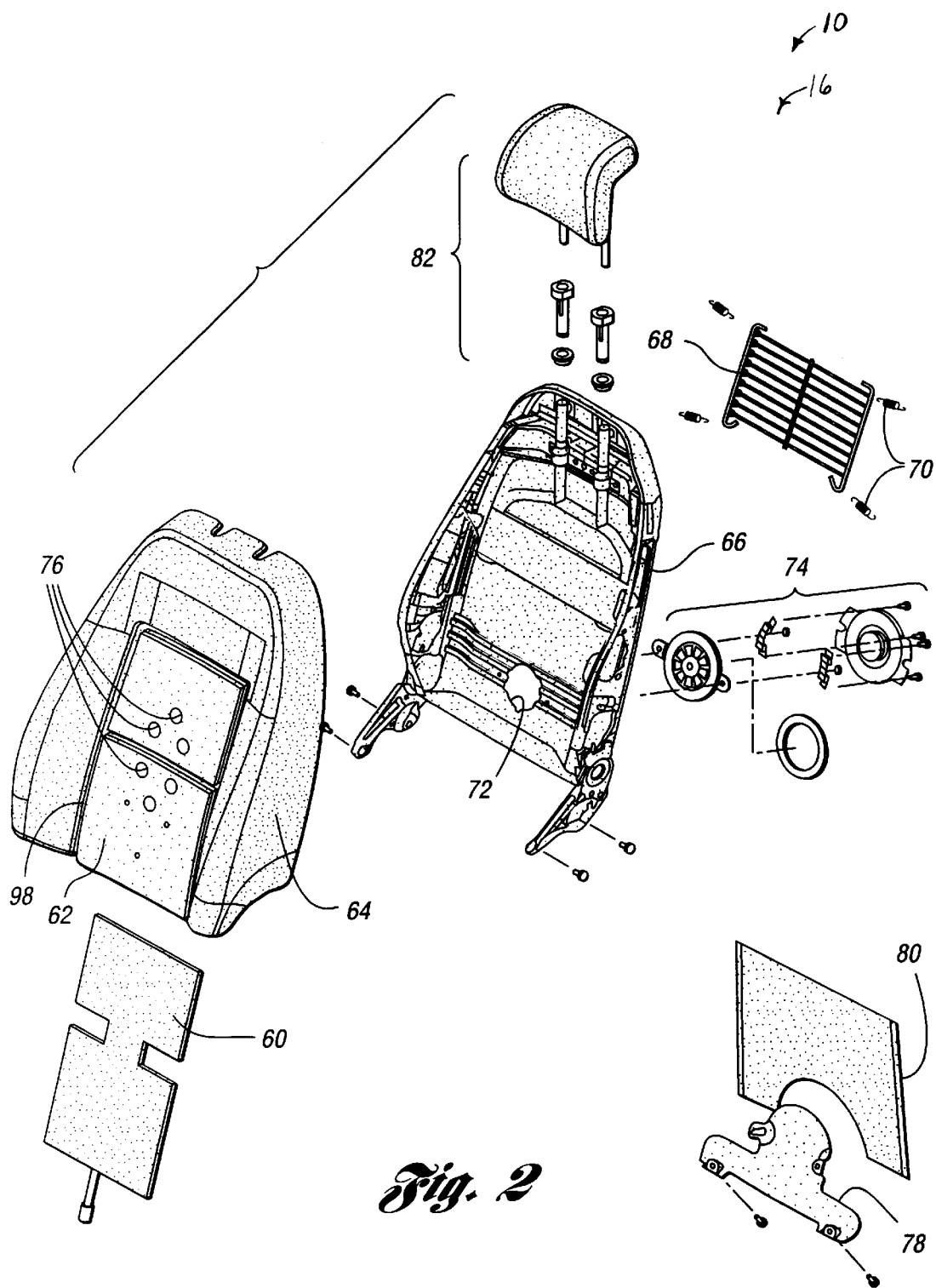
FIG. 2 shows an exploded perspective view of a seat back assembly in accordance with the present invention.

Referring to FIGS. 1–3, a vehicle seat assembly 10 is shown in accordance with the present invention. The vehicle seat assembly 10 comprises a leather cover 12 adapted to cover a lower seat assembly 14 and seat back assembly 16. The leather cover 12, shown in FIG. 1, includes porous surfaces 18,20 to facilitate transfer of heat and moisture from a vehicle occupant through a seat ventilation system, as described below.

Attached to the porous leather trim cover 12, but not shown, are a perforated fabric, a foam layer with open cells, and a polyester web material with apertures formed therethrough. Such components are pre-attached directly to the leather trim cover 12, and attached to the lower seat assembly 14 and seat back assembly 16 with the leather trim cover 12.

With respect to the lower seat assembly 14, the porous surface 20 of the leather trim cover 12, and its attached layers of fabric, foam and polyester web, are secured over a heating pad 22, shown in FIG. 3. The heating pad 22 is preferably a porous material to allow transfer of heat and moisture therethrough in the presence of a pressure differential. The heating pad 22 is placed on top of a lower foam cushion 24. The lower foam cushion 24 includes a plurality of air holes 26 formed therethrough from the top surface 28 to the bottom surface 30 thereof, as shown in FIGS. 3 and 10.

As shown in FIG. 3, the lower foam cushion 24 is secured atop a seat pan assembly 32, which is preferably a steel component, and a spring net 34 is supported by a plurality of springs 36 across the pan assembly 32 for supporting the lower foam cushion 24. A fan assembly 38 is secured to the fan opening 40 on the pan assembly 32 for creating a vacuum within the air holes 26 for drawing heat and moisture from the porous surface 20 of the other trim cover 12.

As shown in FIGS. 6–10, a bottom flow channel 42 is formed along the bottom surface 30 of the lower foam cushion 24 in fluid communication with the plurality of air holes 26 for directing air flow toward the impeller in the fan assembly 38.

A special feature of the present invention is that the bottom flow channel 42 comprises a porous cushion member 44 through which air flows while the porous cushion member 44 cushions the vehicle occupant. The porous cushion member 44 could be a rubber hair material such as that available from Fehrer Corporation of Kitzingen-Main, Germany, or other open cell material which provides cushioning support while allowing air to flow therethrough. The lower surface 46 is covered with a thin polyurethane sheet 48 for preventing escape of air flow from the porous cushion member 44 and for directing the air flow to the fan assembly 38.

The foam cushion 24 also includes a large aperture 50 in communication between the bottom flow channel 42 and the fan assembly 38. Also shown in FIG. 8 is a rod 50 configured for attachment to the leather cover 12 along its bottom edges by means of hog rings for attaching the cover 12 to the seat assembly. FIGS. 3, 8 and 10 also show a channel 52 formed in the top surface 28 of the cushion 24 for trim cover attachment.

Accordingly, the lower seat assembly 14 is provided with appropriate structure for creating a vacuum to draw heat and moisture away from the porous surface 20 of the trim cover 12. Furthermore, the porous cushion member 44 is effective in enabling such air flow between the air holes 26 and the fan assembly 38 while still providing cushioning support to the vehicle occupant.

Turning to FIGS. 2, 4 and 5, similar structure is provided in the seat back assembly 16. The porous surface 18 of the trim cover material 12 again includes a perforated fabric, a foam layer with open cells, and a polyester web material secured thereto. A heating pad 60 is attached over the front surface 62 of the seat back foam cushion 64. The heating pad 60 is preferably a porous material to allow transfer of heat and moisture therethrough.

The seat back foam cushion 64 is positioned against a backrest frame 66, and a spring net 68 and springs 70 are provided for supporting the seat back foam cushion 64 with respect to the backrest frame 66. The backrest frame 66 includes an aperture 72 formed therethrough for cooperation with the impeller assembly 74. Accordingly, the impeller assembly 74 may communicate with the aperture 76 formed in the seat back foam cushion 64 for creating a vacuum, and thus a pressure differential is established across the porous surface 18 of the trim cover 12 for drawing heat and moisture away from the vehicle occupant.

An air evacuation bracket 78 and cardboard plate 80 are positioned over the back of the impeller assembly 74 for directing drawn air downward toward the bottom of the seat assembly.

As shown in FIG. 2, the seat back assembly 16 also includes a headrest assembly 82.

Turning to FIGS. 4 and 5, the seat back foam cushion 64 includes front and rear surfaces 84,86, respectively. A plurality of air channels 76 extend from the front surface 84 to the rear surface 86 of the seat back foam cushion 64. A rear flow channel 88 is formed along the rear surface 86 in fluid communication with the plurality of air channels 76 for directing air flow toward the impeller assembly 74 through the bellows 90.

Preferably, the rear flow channel 88 comprises a porous cushion member 92, such as a rubber hair material, or open cell material, for allowing air to flow therethrough while cushioning the vehicle occupant. The back surface 94 is covered with a polyurethane sheet 96 for preventing escape of air from the porous cushion member 92 and for directing air to the bellows 90. The front surface 84 of the seat back foam cushion 64 also includes a channel 98 formed therein, as shown in FIGS. 2 and 5, for trim cover attachment.

Accordingly, the impeller assembly 74 may be used for creating a vacuum within the seat back foam cushion 64 for drawing heat and moisture away from the porous surface 18 of the trim cover material 12 for improving occupant comfort. The porous cushion member 92 allows such movement of air within the seat back foam cushion 64 while providing cushioning support for the vehicle occupant.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly, comprising:
   a seat back including a seat back foam cushion therein having front and rear surfaces, said seat back foam cushion having a plurality of air channels formed therethrough from the front to rear surface,
   a porous trim cover material positioned adjacent the front surface of the seat back foam cushion;

a first impeller positioned in fluid communication with said plurality of air channels for creating a pressure differential for moving heat and moisture away from said trim cover material; and a rear flow channel formed along said rear surface in fluid communication with said plurality of air channels for directing air flow toward the first impeller, wherein said rear flow channel comprises a porous cushion member through which air flows while the porous cushion member cushions a vehicle occupant.

2. The vehicle seat assembly of claim 1, wherein said rear flow channel further comprises a thin, air-impermeable layer positioned against the porous cushion member.

3. The vehicle seat assembly of claim 1, wherein said porous cushion member comprises a rubber hair material.

4. The vehicle seat assembly of claim 1, further comprising:

a lower seat including a lower foam cushion therein having top and bottom surfaces, said lower foam cushion having a plurality of air holes formed therethrough from the top to the bottom surface;

said porous trim cover material further extending from the seat back foam cushion across the top surface of the lower foam cushion;

a second impeller positioned in fluid communication with said plurality of air holes for creating a vacuum for drawing heat and moisture away from said trim cover material.

5. The vehicle seat assembly of claim 4, further comprising a bottom flow channel formed along said bottom surface in fluid communication with said plurality of air holes for directing air flow toward the second impeller, wherein said bottom flow channel comprises a porous cushion member through which air flows while the porous cushion member cushions the vehicle occupant.

6. The vehicle seat assembly of claim 5, wherein said rear flow channel further comprises a thin, air-impermeable layer positioned against the porous cushion member.

7. The vehicle seat assembly of claim 5, wherein said porous cushion member comprises a rubber hair material.

8. A vehicle seat assembly, comprising:

a seat back including a seat back foam cushion therein having front and rear surfaces, said seat back foam cushion having a plurality of air channels formed therethrough from the front to rear surface;

a porous trim cover material positioned adjacent the front surface of the seat back foam cushion;

a rear flow channel formed along said rear surface in fluid communication with said plurality of air channels, wherein said rear flow channel comprises a porous cushion member through which air flows while the porous cushion member cushions a vehicle occupant;

means for moving air through the porous cushion member for moving heat and moisture away from the porous trim cover material, said means for moving air comprising a first impeller positioned in fluid communication with said rear flow channel for creating a vacuum for drawing heat and moisture away from said trim cover material;

a lower seat including a lower foam cushion therein having top and bottom surfaces, said lower foam cushion having a plurality of air holes formed therethrough from the top to the bottom surface;

a bottom flow channel formed along said bottom surface in fluid communication with said plurality of air holes, wherein said bottom flow channel comprises a porous cushion member through which air flows while the porous cushion member cushions the vehicle occupant; and means for moving air through the bottom flow channel comprising a second impeller positioned in fluid communication with said bottom flow channel for drawing heat and moisture away from the trim cover material.

9. The vehicle seat assembly of claim 8, further comprising a bellows in fluid communication between the first impeller and the rear flow channel.

10. A vehicle seat assembly, comprising:

a seat back including a seat back foam cushion therein having front and rear surfaces, said seat back foam cushion having a plurality of air channels formed therethrough from the front to rear surface;

a rear flow channel formed along said rear surface in fluid communication with said plurality of air channels, wherein said rear flow channel comprises a porous cushion member through which air flows while the porous cushion member cushions the vehicle occupant;

a lower seat including a lower foam cushion therein having top and bottom surfaces, said lower foam cushion having a plurality of air holes formed therethrough from the top to the bottom surface;

a bottom flow channel formed along said bottom surface in fluid communication with said plurality of air holes, wherein said bottom flow channel comprises a porous cushion member through which air flows while the porous cushion member cushions a vehicle occupant;

a porous trim cover material positioned adjacent the front surface of the seat back foam cushion and adjacent the top surface of the lower foam cushion; and a first impeller positioned in fluid communication with said rear flow channel and a second impeller positioned in fluid communication with said bottom flow channel for creating a pressure differential for moving heat and moisture away from said trim cover material.

11. The vehicle seat assembly of claim 10, wherein said rear flow channel further comprises a thin, air-permeable layer positioned against the porous cushion member.

12. The vehicle seat assembly of claim 10, wherein each said porous cushion member comprises a rubber hair material.

* * * * *